Figure 7:
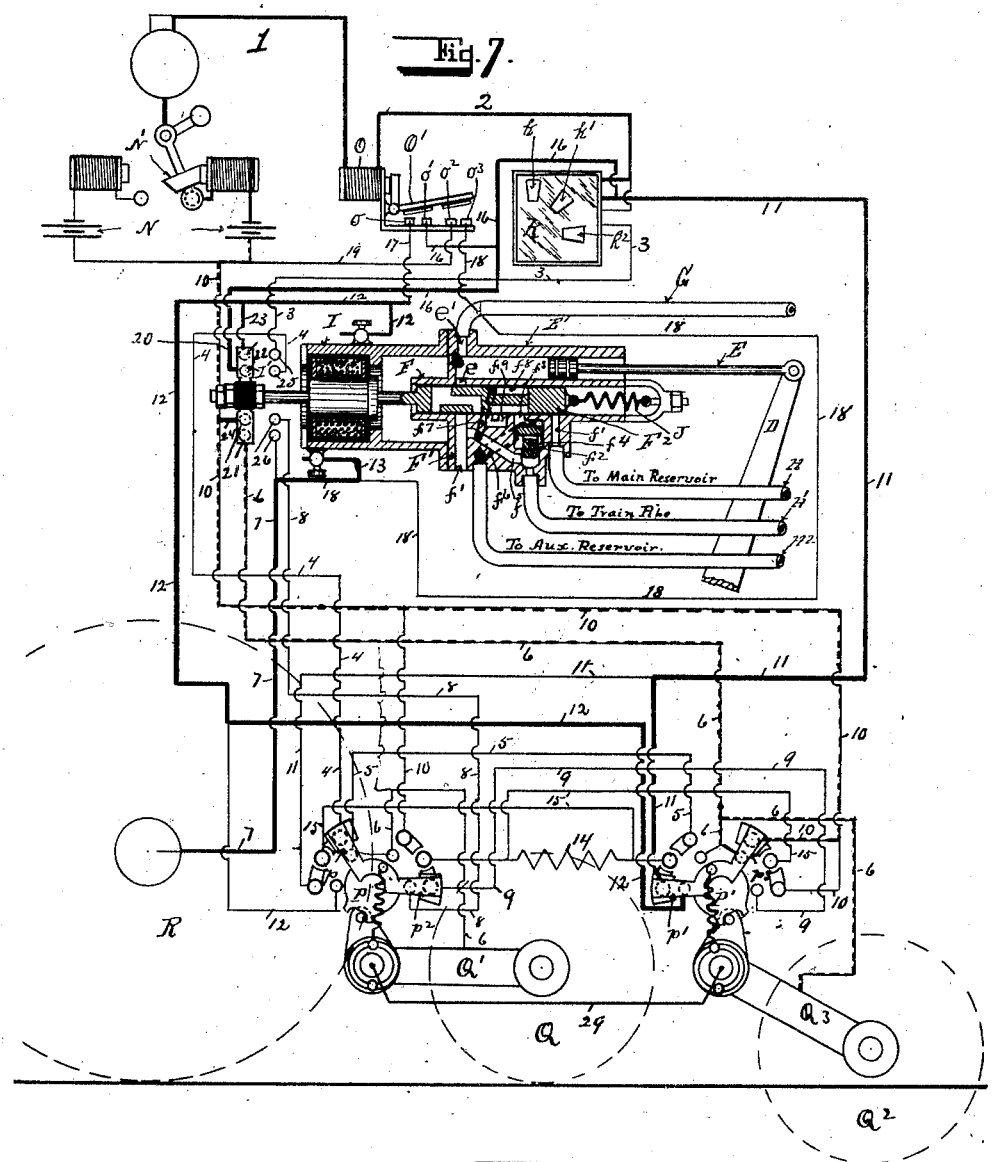

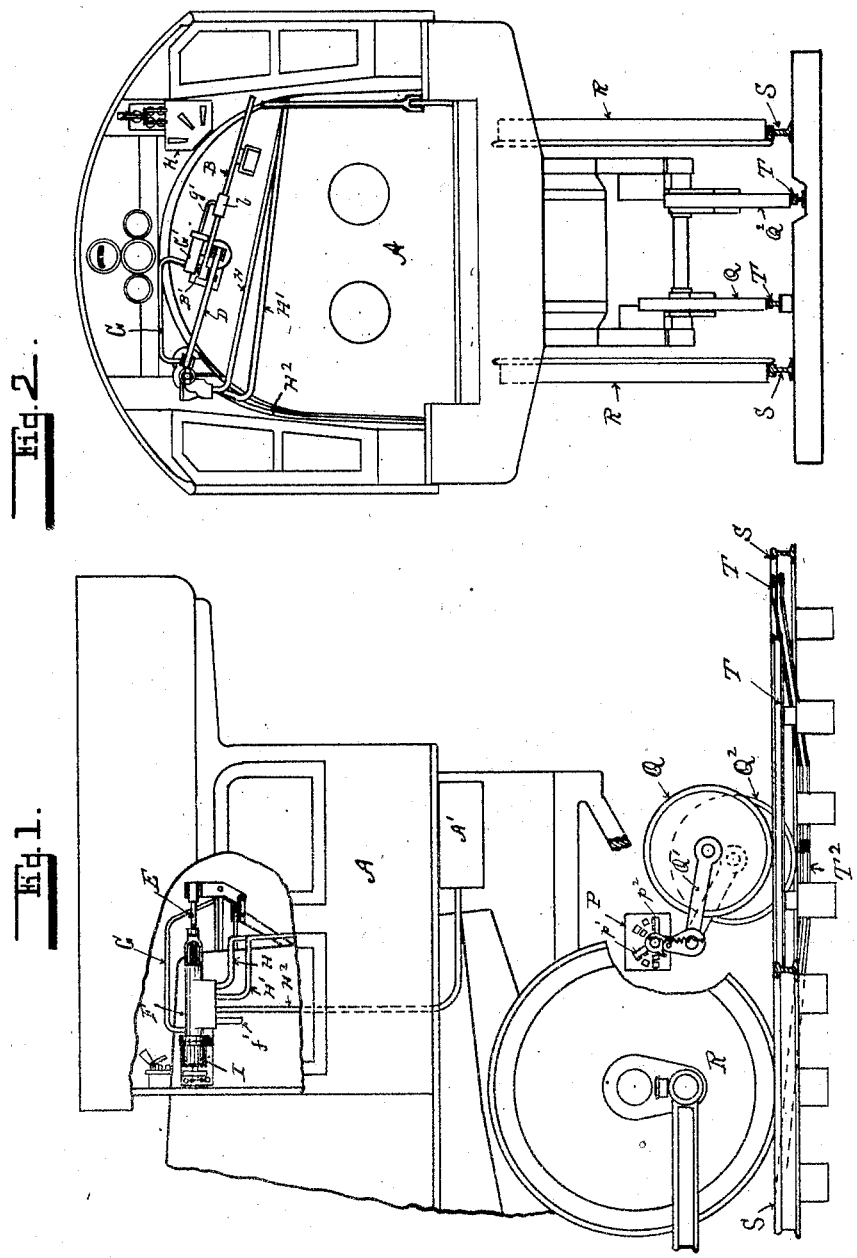

A. S. LITTLETON.
ELECTRICALLY ACTUATED AUTOMATIC TRAIN STOPPING MECHANISM.
APPLICATION FILED JAN. 27, 1909.
1,043,017.
Patented Oct. 29, 1912.
7 SHEETS—SHEET 2.
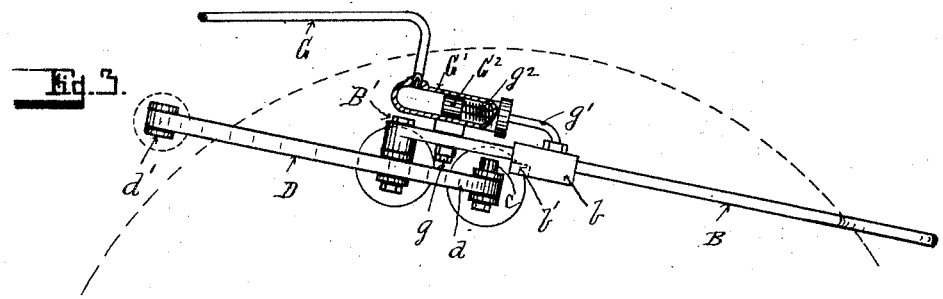
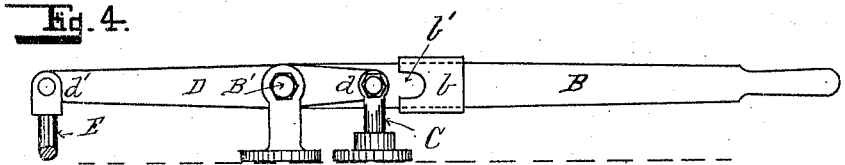
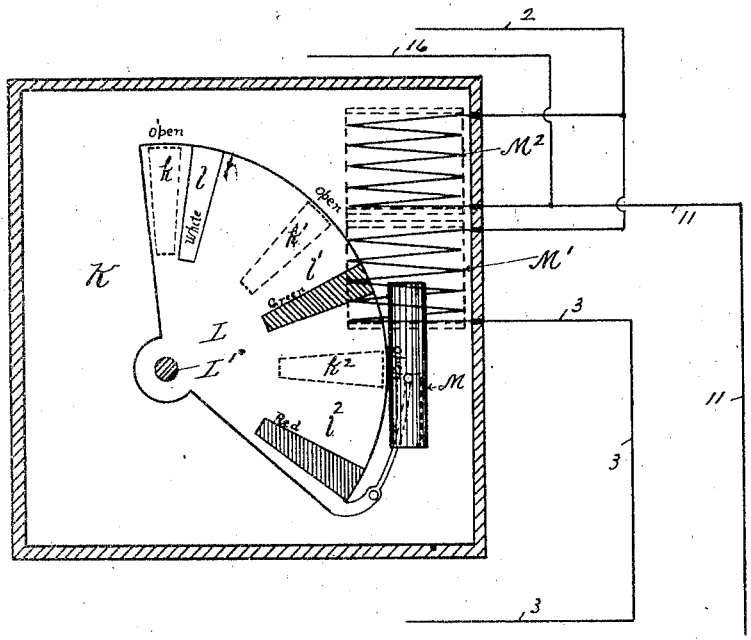

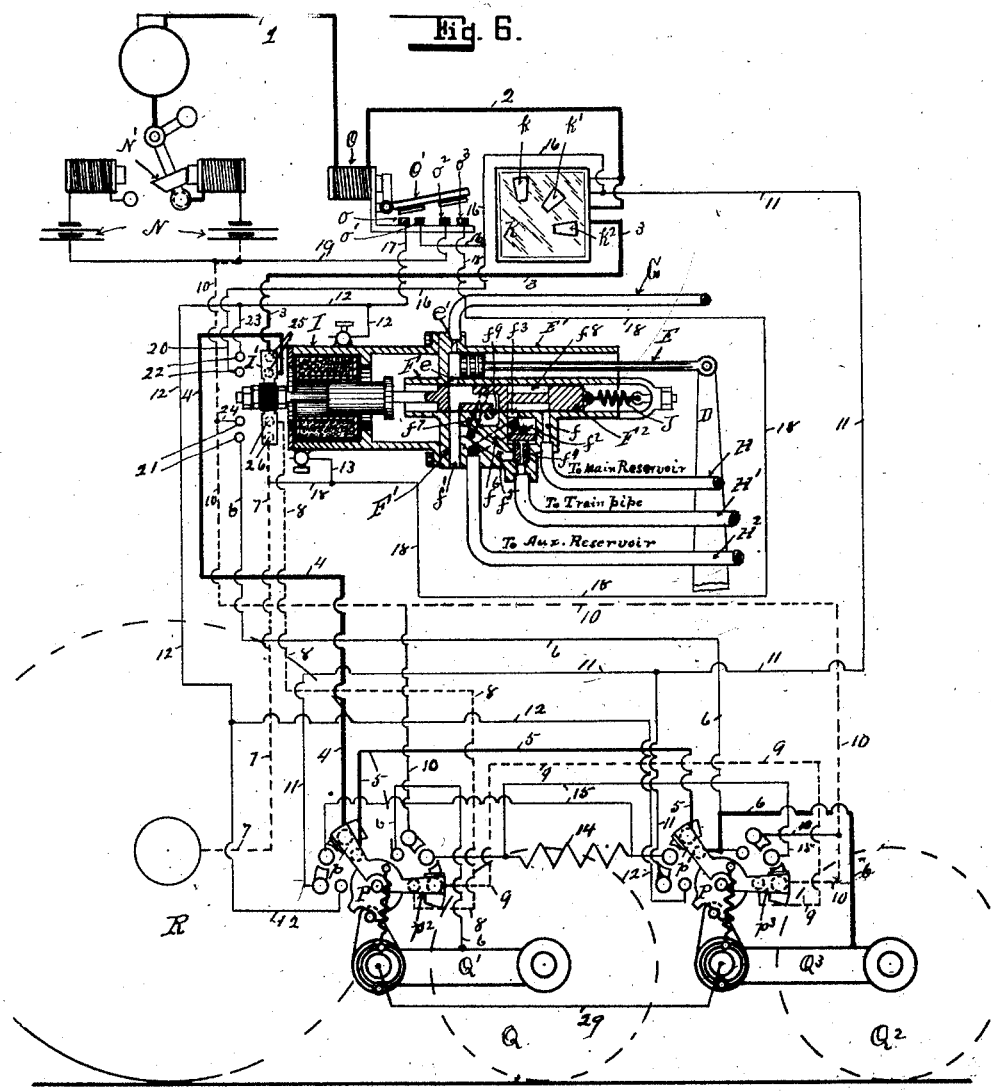

A. S. LITTLETON.
ELECTRICALLY ACTUATED AUTOMATIC TRAIN STOPPING MECHANISM.
APPLICATION FILED JAN. 27, 1909.

1,043,017.

Patented Oct. 29, 1912.

7 SHEETS—SHEET 4.

Witnesses.
G. J. Mead
Florence Stockert

Inventor.
Alexander S. Littleton
By J. C. & W. M. Sturgeon
Attys.

A. S. LITTLETON.
ELECTRICALLY ACTUATED AUTOMATIC TRAIN STOPPING MECHANISM.
APPLICATION FILED JAN. 27, 1909.
1,043,017.
Patented Oct. 29, 1912.
7 SHEETS—SHEET 5.
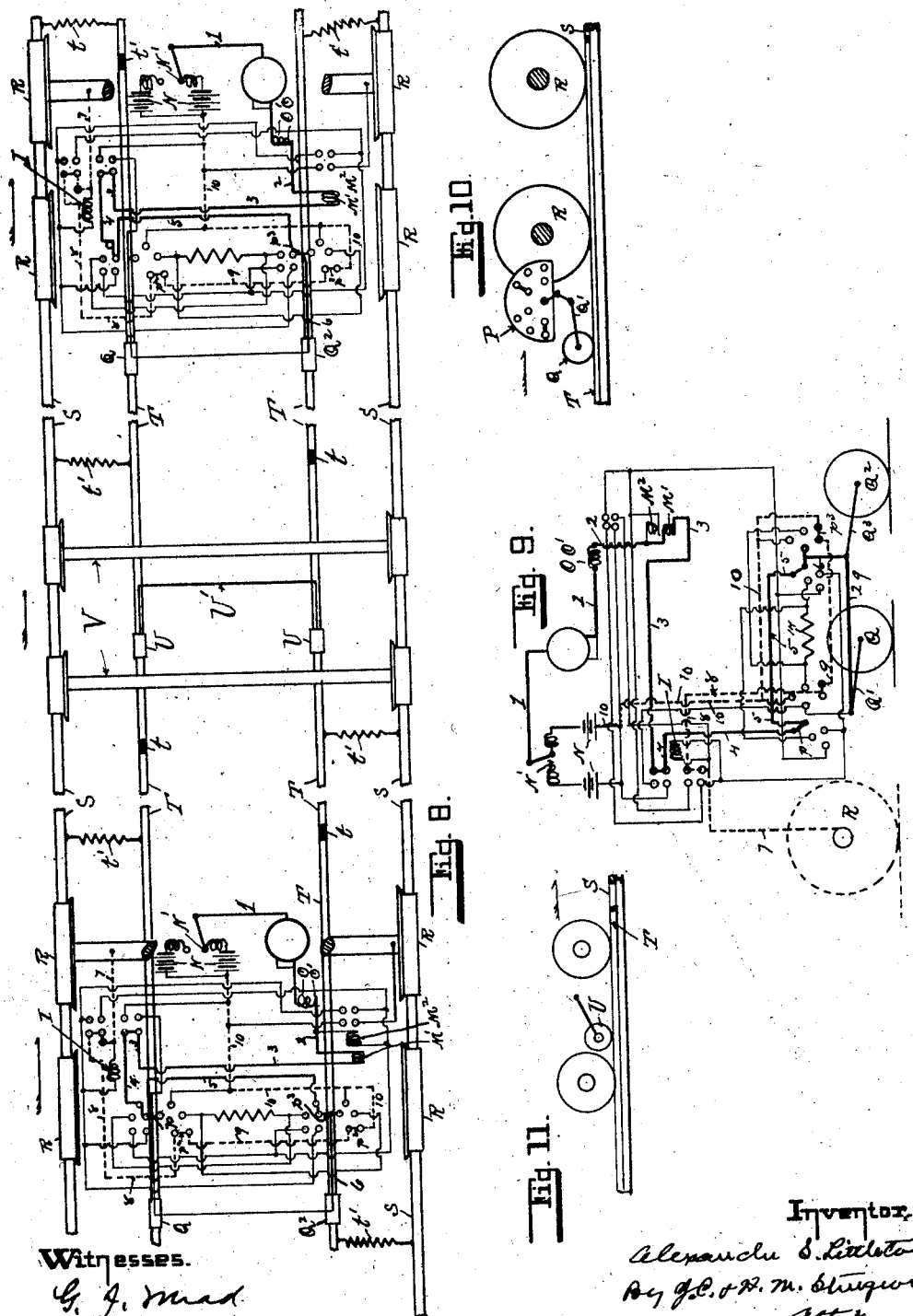
Witnesses.
G. J. Mead
Florence Stockert
Inventor.
Alexander S. Littleton
By J.C. & H. M. Sturgeon
Attys.

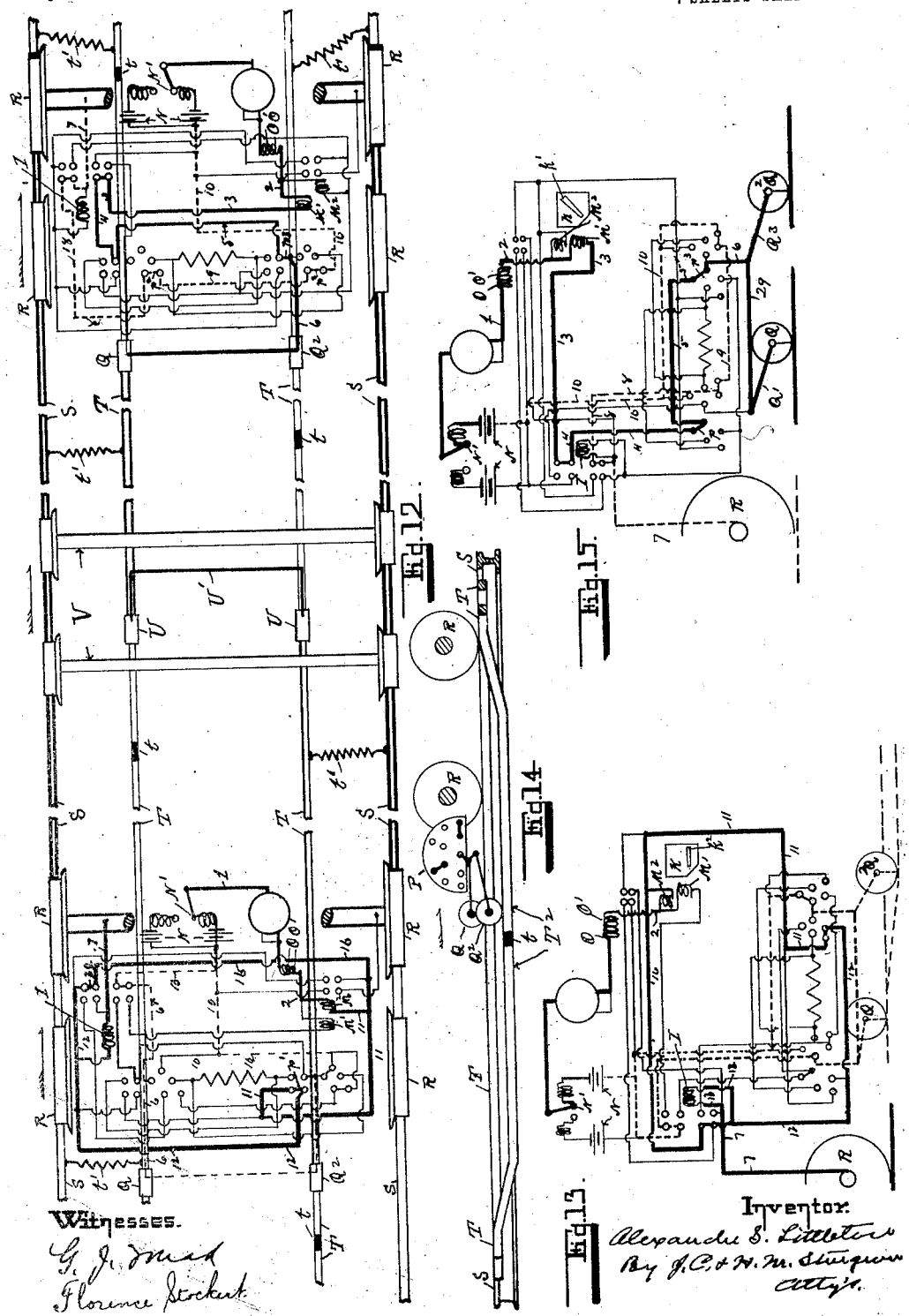

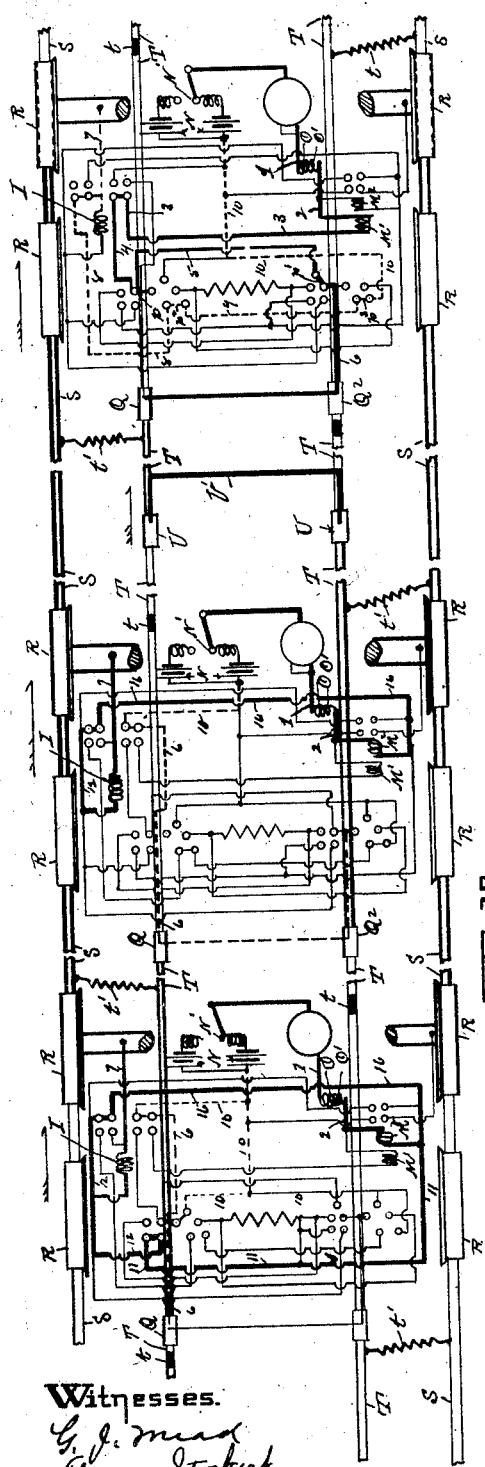

BEST AVAILABLE COPY

UNITED STATES PATENT OFFICE.

ALEXANDER S. LITTLETON, OF ERIE, PENNSYLVANIA.

ELECTRICALLY-ACTUATED AUTOMATIC TRAIN-STOPPING MECHANISM.

1,043,017.

Specification of Letters Patent.  Patented Oct. 29, 1912.

Application filed January 27, 1909. Serial No. 474,446.

*To all whom it may concern:*

Be it known that I, ALEXANDER S. LITTLETON, a citizen of the United States, residing at Erie, in the county of Erie and State of Pennsylvania, have invented certain new and useful Improvements in Electrically-Actuated Automatic Train-Stopping Mechanism; and I do hereby declare the following to be a full, clear, and exact description of the invention, such as will enable others skilled in the art to which it appertains to make and use the same, reference being had to the accompanying drawings, and to the characters of reference marked thereon, forming part of this specification.

My invention relates to improvements in automatically actuated electric and electropneumatic train control systems of the normally clear class, and embodies automatically and positively acting electric or electropneumatic apparatus carried on the train-motor and acting directly on the power-supplying and brake-actuating mechanism, to stop the train-motor, and locking mechanism operating automatically to lock the power shut off and brake applying mechanism from action so long as the condition which operated to stop the train-motor exists.

The objects of this invention are: 1st, to provide a train-motor with automatically operated mechanism whereby it will be automatically slowed down, or brought to a full stop, without undue shock, whenever a condition dangerous to the further progress of the train exists, which condition may be caused either by a broken circuit or by a closed circuit produced either by the presence of another train within the block being entered, or by other cause, regardless of the direction of travel or motion or non-motion of the train first within the block section being entered by a second train, without any dependence or interdependence on the previous action of any signal apparatus, whether carried by the motor itself, or external thereto, or upon the action of any timing or other auxiliary apparatus, whether automatically or manually operated. 2nd, to provide apparatus as a part of said mechanism which automatically locks the power applying and brake-setting mechanism, immediately upon their action in stopping the train-motor, against any manual operation, until the cause or causes of the stopping of the train are removed, and when said cause is so removed to automatically release the locking mechanism, so that the power applying and brake releasing mechanism can be manually operated to start the train. 3rd, to provide signal mechanism on the train-motor which operates simultaneously with the train stopping and brake-setting mechanism, the operation of such signal apparatus being, however, in no way essential to the operation of said train-stopping and brake-setting apparatus, neither will the operation of the said signal apparatus in any way impede, retard, or hasten the action or non-action of the brake-apparatus.

4th. A further object of this invention is to completely control the movement of the infringing train entering an occupied block without affecting the movement of the train then occupying the block, other than to bring the signal mechanism of such train into circuit so as to show through the signal apparatus of such train, that another train is entering the block.

5th. Another object of this invention is to provide as a part of such apparatus, means whereby a defective source of current is automatically replaced by an effective one without manual action of any kind.

The general features of my invention comprise substantially, a source of electrical power, train stopping mechanism consisting of mechanism showing signals, mechanism for shutting off the motive power, mechanism for applying the brakes, and means for locking said mechanism against manual release, and automatically actuated motor mechanism for operating said devices, all mounted upon a train-motor, together with suitable electric circuits connected therewith provided with automatically operating switch mechanism therein and communicating with the main track and with the conductors, so that under normal conditions there is always a circuit of low amperage through the rails, conductors, and circuits on the train-motor, which is of sufficient strength to hold a no-voltage switch in an open position; but when this circuit is broken by a break in the track circuit the no-voltage coil releases the switch mechanism so that another circuit through an electromagnet or solenoid on the train-motor will be automatically completed; the operation of which circuit through said magnet or solenoid actuates the mechanism for shutting off the power for applying the brakes, and for locking said mechanism, after it has been so operated, against manual operation. When, however, the circuit is again completed, the no-voltage coil switch has to be manually opened to release the power shut-off and brake-setting mechanisms, so as to allow the train-motor to again proceed.

A train motor provided with the mechanism above noted has one side of the electric circuit thereon connected with the wheels operating on the main track rails, and the other side of said circuit connected with a circuit changing switch and thence to contact shoes communicating with one or more conductors preferably laid between the main rails. These conductors are divided into blocks, and when the track conditions are normal for safely running the train the no-voltage switch on the train-motor will be retained in an open position. When however, the train-motor enters a block occupied by another train a circuit is immediately formed therewith through the contact shoes and circuit changing switch on the infringing train-motor, which operates through the circuits on said train-motor to actuate the power shut-off, brake actuating and lock mechanism thereon, to stop said train-motor and retain it so stopped until the other train is removed from the block. The circuit thus operating to actuate the brake-setting and power shut-off mechanism existing but a short time, it is therefore necessary to automatically establish a circuit which will operate to prevent the release of the brakes and power shut-off mechanism on the train motor until the track is clear for the movement of said train-motor, and for this purpose switch mechanism is provided which automatically operates to maintain the operative circuit through said power shut-off and brake-setting controlling device after the aforesaid circuit-changing switch has returned to its normal position, and until the block is cleared.

That the engineer may have notice of an interfering train, or other dangerous condition to the operation of the train he is running, there is a signal circuit provided, containing a solenoid in circuit, the core of which is actuated by the variations of the strength of the current passing through said circuit and solenoid thereby indicating the gravity of the danger.

When two train motors are similarly equipped with the apparatus hereinbefore described and having contacts with the same external circuits or track rails and are on different blocks there is normally no circuit between them, as the currents of like terminals meet. When, however, a train-motor enters a block occupied by another train, a circuit-changing switch on the incoming motor is thrown by a trip as it enters such occupied block, which operates to reverse the normal polarity of the track rails and conductors in said block, and a circuit is thereby completed through any other train or train-motor in said block, and the electric current traversing said circuit, automatically operates the signal, power shut-off, brake, and locking mechanism on the train motor thus entering said block, as hereinbefore described.

During the movement of the circuit-changing switch in its operation of changing the polarity of the track rails and conductors, there is a momentary break of all circuits, which would normally cause the no-voltage coil to release the switch operated thereby, so that the current from the generator on the train-motor would energize the solenoid operating the power shut-off and brake-operating mechanism. To prevent this action of the no-voltage coil the circuit-changing switch is provided with arms which, during its operation, engage contacts adapted to direct the current through an idler circuit having a high resistance until the operation of the circuit-changing switch completes the change in the polarity of the circuits, whereby a low amperage current is so maintained through the no-voltage coil that the switch controlled thereby will remain in its normal open position during the operation of the circuit changing switch.

The track circuits forming part of and adapted for the operation of train-motors equipped with circuits and mechanism hereinbefore referred to, consist substantially of the track rails continuously bonded, except at switches, where special bonding is arranged for, and one or more intermediate conductors running parallel with the track rails and divided into blocks of any desired length by means of suitable insulation, and provided at one end of each block with trip mechanism adapted to automatically operate a circuit-changing switch. When two such conductors are used, the block terminals therein preferably alternate by half the length of the block, thus dividing each block into half blocks. Each block of a conductor is connected by a resistant connection to the track rail adjacent thereto, so that each track rail forms a low amperage circuit with the block of the conductor adjacent thereto.

On the train motor there is a vertically movable contactor in continuous circuit with each conductor, and connected with the contactors and operated thereby there are circuit-changing switches, by means whereof the contactors successively connect with the various circuits on the train-motor. The train-motor wheels form the contacts with the track-rails for the opposite sides of said circuits, so that the circuits on the train-motor connect substantially with two independent rail and conductor circuits, the breaking of either of which will interrupt the low-amperage current which will release the no-voltage switch and close the circuit which operates the signal, power shut-off, brake and locking mechanism on the train motor, so that a broken rail, or a misplaced switch on either side of the track, or a train in the same block, will automatically operate the mechanism on the train motor and cause the train to stop, and hold it stopped until the difficulty is removed from the block.

These and other features of my invention are hereinafter fully set forth and described, and diagrammatically illustrated in the accompanying drawings, in which:

Figure 1, is a side view in elevation of a locomotive or train-motor, with parts thereof broken away, equipped with my apparatus. Fig. 2, is a rear view of the same. Fig. 3, is a detail view of the power lever disengaging mechanism of my invention. Fig. 4, is a detail side view of the same. Fig. 5, is a diagrammatic view of the signal mechanism of my invention. Fig. 6, shows diagrammatically my apparatus and its circuits on the train motor, in a normally inoperative condition. Fig. 7, shows diagrammatically my apparatus and its circuits on a train motor when operating to stop the train motor. Fig. 8, shows diagrammatically a train-motor on one block approaching a train on the next block ahead, with all apparatus in normal running condition. Fig. 9, shows diagrammatically another view of the circuits, track and conductor connections therewith, in normal running condition. Fig. 10, shows diagrammatically a detail of the circuit-changing switch and the conductor contact connections. Fig. 11, shows diagrammatically a detail of the conductor connections for the rear car of a train. Fig. 12, shows diagrammatically a view of the circuits on two train-motors and the track connections therewith, one of which trains is just entering a block occupied by the other. Fig. 13, shows diagrammatically another view of the circuits, track and connections therewith, of a train-motor entering an occupied block. Fig. 14, shows diagrammatically a detail of the conductor trip mechanism at the end of a block and the contact connections operating thereon, and the condition of the circuit changing switch, as the train-motor enters a block. Fig. 15, shows diagrammatically another view of the circuits on the train motor already in the block, as in Fig. 12, and the track and conductor connections therewith. Fig. 16, shows diagrammatically the operations of the circuits of two meeting trains and of a third train following one of the meeting trains. Fig. 17, shows another diagrammatic view of the circuits of the intermediate train motor shown in Fig. 16.

In these drawings illustrating my invention, A, represents a train-motor, and, B, the throttle lever thereof pivoted on a stud, B′, in the usual manner, and normally connected with the throttle valve-stem, C, by means of a sliding sleeve, $b$, on the throttle lever having a slot, $b'$, therein engaging a stud, $c$, on the throttle valve-stem, C, so that the throttle valve-stem, C, can be operated by said lever. Pivoted to the stud, B′, intermediate of its length there is another lever, D, one end, $d$, of which is pivoted to the throttle valve-stem, C, and the other end to a piston-rod, E, so that the throttle valve-stem, C, can be operated by the lever, D, as hereinafter described.

The piston-rod, E, extends into the cylinder, E′, which communicates by means of a port, $e$, with a cylinder, F, having a valve-chest, F′, and by means of a port, $e'$, in said cylinder with an air pipe, G, which extends to a cylinder, G′, pivoted upon the throttle lever, B, by means of a stud, $g$, and in the cylinder, G′, there is a piston, $G^2$, the piston-rod, $g'$, of which is connected to the sliding sleeve, $b$, and a spiral spring, $g^2$, is placed on the rod, $g'$, behind the piston, $G^2$, adapted to retain it in its normal position when the air is exhausted from the opposite end of the cylinder, G′.

The valve chest, F′, shown in Fig. 6, in its normal inoperative condition, and in Fig. 7, in its operative condition, is connected with the main air reservoir (not shown), by means of a pipe, H, with the train pipe, H′, which leads to the usual train air-brake mechanism (not shown), and with an auxiliary air reservoir, A′, by a pipe, $H^2$, and the valve chest cylinder, F′, is provided with a chambered valve, $F^2$, which is connected with a solenoid, I, for moving the valve, $F^2$, into operative position, and with a retracting spring, J, for returning the valve, $F^2$, to its normal inoperative position, as shown in Fig. 6. The valve-chest cylinder, F, is provided in its valve-chamber with an inlet port, $f$, connecting directly with the pipe, H, a discharge port, $f'$, a valve-chamber, $f^2$ having a port, $f^3$ opening into the cylinder, F, and in said chamber, $f^2$, there is a valve, $f^4$, adapted to close the train pipe, H′, and be opened to allow the air to escape therefrom through a by-pass, $f^5$, to the passage, $f'$. From the upper part of the valve chamber $f^2$, a by-pass, $f^6$, extends to and connects with the pipe, $H^2$, leading to the auxiliary air-tank, A′, and from and forming a port in the cylinder, F, a by-pass, $f^7$, extends to the by-pass, $f^5$. When the valve, F, is in its normal inoperative position the air flows from the main reservoir through the port, $f$, through the chamber, $f^8$, in the valve, $F^2$, through the port, $f^3$, and the by-pass, $f^6$, and through the pipe, $H^2$, to the auxiliary reservoir, A′, the pressure on the valve, $f^4$, retaining it in a normally closed position, as shown in Fig. 6. When, however, the valve, $F^2$, is moved by the solenoid, I, it moves to close the ports, $f$ and $f'$, and connects the port, $f^3$, with the by-pass, $f^9$, whereby a passage is opened to the port, $e'$, through the port, $e$, and cylinder, E. The air at once passes from the auxiliary reservoir, A', through chamber, $f^2$, port, $f^3$, by-pass, $f^9$, through valve chamber to port, $e$, through cylinder, E, to port, $e'$, into the pipe, G, and into cylinder, G', and forces the piston, $G^2$, and piston rod, $g'$, outward against the spring, $g^2$, and moves the sliding sleeve $b$, from its contact with the stud, $c$. The levers, B, and D, are now independent of each other and the quadrant latch on the throttle lever, B, (latch not shown) cannot prevent the closing of the throttle valve, the pressure of the air in the cylinder, E', against the piston and rod, E, will move them out and close the throttle by moving the lever, D, and throttle-valve stem, C. The further movement of the valve, $F^2$, to its ultimate position as shown in Fig. 7, will close the port, $e$, and lock the air in the cylinders, E' and G', and the throttle valve cannot again be opened until the air in these cylinders is released. The valve, $F^2$, in the position shown in Fig. 7, has opened a direct passage for the release of the air from the auxiliary reservoir, A', through the pipe, $H^2$, by-pass, $f^6$, chamber $f^2$, port, $f^3$ and valve chamber $f^8$, of the valve, $F^2$, through the by-pass, $f^7$, to the by-pass, $f^5$, and thence to the outlet, $f'$, which reduces the pressure on the train-pipe valve, $f^4$, so that it is raised by the pressure in the train-pipe, H', which permits the air therein to escape through the by-pass, $f^5$, and outlet, $f'$, thereby operating the brake mechanism connected therewith. Meanwhile the throttle moving mechanism and the throttle lever mechanism remain in their inoperative position, incapable of manual operation, until the action of the solenoid, I, upon the valve, $F^2$, ceases, and it is returned by the action of the retracting spring, J, to its normal inoperative position, as illustrated in Fig. 6.

For indicating safe or dangerous running conditions, I provide an indicator, K, see Fig. 5, the face of which is provided with openings, $k$, $k'$, $k^2$, behind which there is an arc of a disk, L, operated on a pivot, L'. On this part, L, there is a white space, $l$, adapted by a slight rotation of the part, L, to coincide with the opening, $k$, showing a white signal; a green space, $l'$, adapted by a still further rotation of the part, L, to coincide with the opening, $k'$, showing a green signal; and a red space, $l^2$, adapted by a still further rotation of the part, L, to coincide with the opening $k^2$, showing a red signal.

For operating the part, L, the core, M, of a solenoid preferably wound with two coils, M', and $M^2$, connected in electric circuits as hereinafter described, is connected with the part, L, so that the variations of the strength of current passing through said solenoid circuits operate to produce the changes of signals hereinbefore described.

Upon the train-motor, electric generators, N, are provided, preferably in duplicate with a suitable switch, N', which is adapted to automatically bring one generator into circuit when the other is exhausted. From this switch, N', a line leads to and through a no-voltage coil, O, adapted to operate a switch, O', and thence by line, 2, to the coil, M', of the signal solenoid, and thence by line 3, to a contact, 25, and thence by line, 4, to a contact with one arm, $p$, of a circuit changing switch, P, which is operated by a conductor contact, Q, hereinafter referred to, and thence by line, 5, to a contact plate and arm, $p'$, of another circuit changing switch, P', which is operated by another conductor contact, $Q^2$, hereinafter referred to, and thence by line, 6, to the arm of the conductor contact, $Q^2$, and thence to the conductor, T, with which the contactor, $Q^2$, contacts, and thence through said conductors and the track rails hereinafter described to the train-motor track wheel, R, and thence by the lines, 7, to contact, 26, and thence by line, 8, to a contact with arm, $p^2$, of the circuit changing switch, P, and thence by line, 9, to a contact with arm, $p^3$ of the circuit changing switch, P', and thence by line, 10, to the generator, N, thus completing a normal, low-amperage circuit, operating on the signal solenoid to show the white or safety signal, 1, said circuit being clearly illustrated in Figs. 6, and 9, and in Fig. 8, in connection with the track and conductor circuits. These track and conductor circuits consist of two track rails, S, S, continuously bonded so as to form continuous electric conductors, and two conductors, T, T, with which conductors the contactors, Q, and $Q^2$, contact. The said conductors, T, are divided into blocks of suitable length insulated from each other, the break, $t$, in each of which is preferably opposite the center of the block in the other, and in each conductor adjacent to the insulated joints there is a depression, $T^2$, or other mechanism, which operates as a trip, as hereinafter set forth. Each block of these conductors, T, is electrically connected with the track rail adjacent thereto by means of a resistance coil, $t'$, so that each block of the conductors, T, is normally in resistant electric circuit with the circuit on the train motor hereinbefore described, and therefore the electrically actuated signal, train stopping and braking apparatus are not affected thereby, because the resistance coils, $t'$, permit a current of only sufficient amperage to pass over said circuit to retain the no-voltage coil switch, O', in an open position.

When, however, the train is entering a block, the dropping of one of the contactors, (Q², for instance) into the depression, T², at the entrance of the block and the consequent movement of the circuit changing switch, P', into the position illustrated in Fig. 7, and there is another train on the block being entered, a circuit is established thereby through the entering train-motor and the train-motor in the block, through which the electric current passes from the generator, N, (see Fig. 12, left hand diagram) by heavy line 1, to and through the no-voltage coil, O, and by heavy line, 2, to and through the signal solenoid, M², and thence by heavy line, 11, to arm, p', of the circuit changing switch, P', and thence by heavy line, 12, to and through the solenoid, I, and thence by heavy line, 7, to and through the wheel, R, on one of the track rails, S, and thence through the normally inactive circuit on the preceding train motor, viz: (see right hand diagram in Fig. 12) from said track rail, S, to the motor wheel, R, thereof, thence to and along broken lines, 7, and 8, to contacts and arm, p², of one of the circuit changing switches, thence by broken line, 9, to contacts and arm, p³, of the other circuit-changing switch, and thence by broken line, 10, to the generator, N, and thence by heavy line, 1, thereof through the no-voltage coil, O, heavy lines, 2, 3, 4, 5, and contactors, Q², and, Q, to and along one of the conductors, T, to and through the contactors, U, U, and connection, U', (by which the current passes from one conductor, T, to the other) to the contactor, Q², (see left hand diagram in Fig. 12) and broken line, 10, to the generator, N, thereon, thus forming a complete high amperage circuit between and through said train motor circuits, the resistance between the conductors and track rails having been cut out by the presence of the preceding (left hand diagram) motor in the block, thereby increasing the normal low-amperage current to the maximum capacity of the generators, N, the same being ample for operating the solenoid, I. If, however there is no train in the block being entered by the train-motor, the action of the trip mechanism on the circuit changing switch at the entry of said block, being but momentary, does not make any change in the normal resistant circuit, as during the action of the circuit changer, P, or, P', the current is shunt circuited for the instant through a resistant idler circuit, 14, 15. To accomplish this result the outer ends of the switch arms p, p', p², and p³, and the terminal contacts of lines, 11, 4, 10 and 9, at the circuit changing switch, P, and of lines, 11, 5, 10, and 16, at the other circuit changing switch, P', (see Figs. 6 and 7) are of such relative dimensions that the outer ends of each of said switch arms will, at the intermediate points of their traverse, overlap three of said contacts, and during such momentary overlapping, while the circuit changing switch is being operated, the circuit will be from the generator, N, by heavy line, 1, to and through coil, O, by heavy line, 2, to and through the signal solenoid, by heavy line, 11, (see Fig. 7) switch arm, p' to and through resistant idler circuit 14, 15, switch arm, p³, and by broken line 10 to generator, N, thus maintaining a complete uninterrupted circuit and a current of low amperage through the no-voltage coil, O, during the passage of the contactors, Q, or, Q², over the trips, T², in the conductors, T, so that before the normal current from the track-rails to and from the generator, N, is broken, the above pointed out shunt circuit, having a resistance equal to the resistance, t', between the track rails, S, and conductors, T, has been established in order that the normal low amperage current through the coil, O, and signal solenoid, M', will not be interfered with. The operation of the other circuit changing switch, P, in regard to the resistant idler circuit, 14, 15, above described, is identical with that of the switch, P', but alternating therewith.

When the solenoid, I, is operated it is necessary to retain it in its operated position against the tension of the retracting spring, J, and therefore a circuit changing switch, I', is provided on the stem of the solenoid, I, which is, by the operation of the solenoid, I, brought into contact with the terminals, 22, which thereby changes the direction of the path of the current so that its circuit is through lines, 1, 2, 16, 20, and terminal, 22, lines 23, 12, through solenoid, I, and then by lines, 13, 18, 7, to wheel, R, and thence through the normal low amperage circuit of the preceding train-motor and returning through the contactor, Q², and line, 6, to contact, 21, and thence by lines, 24, and, 10, to the generator, N, (see heavy lines in Fig. 7), thereby continuing the solenoid I in circuit with the other train on the block after the circuit changing switch, P', has returned to the normal position thereof as shown in Fig. 6, when the contactor, Q², has passed out of the trip, T², in the conductor, T, and until the train ahead has passed out of the block. In case, however, the train-motor, A, is entering a block having therein a broken rail, or in which there is a misplaced switch, or other obstruction which breaks the normal low amperage circuit in the block being entered, the electric current through the no-voltage coil, O, ceases, and the switch, O', immediately falls thereby closing the terminals, o, o', o², and o³, which connects the terminals, o, and o', and the terminals, o², and, o³, by means whereof the electric current is shunt-circuited through line, 1, coil, O, line, 2, solenoid coil, M², line 16, to switch contact, o', and thence by switch contact, o, and line 17, to one terminal of the solenoid, I, and thence by the other terminal of said solenoid by lines, 13 and 18, to switch contact, o³, and from switch contact, o², by line 19, back to the generator, N, independent of the track and conductor circuits hereinbefore referred to. There being no resistance in the circuit last described, the electric current therethrough is of sufficient strength to cause the signal apparatus to indicate danger, and also to energize the solenoid, I, so as to operate the valve mechanism connected therewith, and this action will continue until the current through, the above described shunt circuit is broken by the opening of the switch, O', and the closing of the armature of the no-voltage coil, O.

When the no-voltage switch has been allowed to fall down and close, as above described, the armature of the no-voltage coil, O, is at such a distance from the core of said coil, that when the shunt circuit last above described, is completed through said coil O, the magnetism of said core is not sufficient to raise said switch, but the same must be manually raised and said armature brought again within range of the magnetism of the core of said coil, O, in order to release the solenoid, I, so that the motor, A, can proceed. It will be observed that duplicate electric circuits on the train-motor, A, are so arranged that they communicate with each of the contactors, Q, and Q², which circuits have been heretofore fully described, and therefore further description of the same is unnecessary.

The contactors, Q, Q², are provided with a permanent connection 29, between them, and I have further provided the cross lines, 15, by means whereof the action of either one of the circuit changing switches, P, or P', also operates to connect the circuits, so that at all times there is a complete operative circuit in use, or ready for use, when required.

In Fig. 8, I illustrate, diagrammatically, the track rails, S, S, and three blocks of conductors, T, with two train-motors, running in the same direction on separate blocks, a complete conductor block intervening between the block occupied by the forward train-motor and the block occupied by the rear train-motor, the forward train being of such length that its rear car laps over onto the intervening block. To provide for this contingency, said rear car, V, is provided with contactors, U, U, which form a connection or bridge, U', between the conductors, T, T, the same as a train-motor would, so that there is always substantially half the length of a conductor block between said rear car, V, and an approaching train-motor in the rear thereof, which can be affected by the train in front of it. The object of this connection or bridge, U', on the car, V, at the rear of the train occupying the block being entered by an approaching train-motor, is to so bridge the conductors, T, T, at the rear of such train that two conductor-blocks are connected together, so that an approaching train-motor is affected by the forward train-motor through the bridge, U, on said rear car, V, of the forward train when it is in the block being entered by an approaching train-motor so that the forward train-motor operates the same on the approaching train as if both train-motors were in the same block.

A detail of the contactors, U, is illustrated in Fig. 11. The train-motor on both the front and rear trains, illustrated in Fig. 8, and in normally low amperage, indicating safe running condition, and the circuits operative under such condition are shown diagrammatically by heavy black and broken lines, and also in Fig. 9, by another diagrammatic view of the same, and in Fig. 10, one of the circuit changing switches, P, or P', is diagrammatically shown with its contactor, Q, in contact with one of the conductors T.

In Fig. 12, I illustrate, diagrammatically, the tracks, S, conductors, T, and two trains thereon running in the same direction, the rear one of which has entered the block occupied by the rear end of the forward train. The rear train circuits then in operation are shown in heavy and broken lines, and show the current passing through the signal solenoid and through the solenoid, I, operating the valve mechanism, thereby shutting off the power from the approaching rear train-motor and setting the brakes thereon, and Fig. 13, shows another view of said approaching train-motor circuits then in operation by heavy black and broken lines, and Fig. 14, shows, diagrammatically, one of the block ends, and one of the contactors on the approaching rear train motor illustrated in Figs. 12 and 13, just after it has entered an occupied block showing the circuit changer, P, reversed to establish the circuits on the rear train-motor illustrated by heavy black and broken lines in Figs. 12 and 13.

In Fig. 15, I show another view of the forward train-motor circuits, illustrating the circuits by heavy black and broken lines in use thereon when another train enters a block occupied by it. It will be noted that this circuit on the forward train-motor is inoperative in relation to the solenoid, I, thereon, but that it passes through the signal mechanism on the forward train, so that the engineer on the forward train-motor may be warned of danger to his train, as well as the engineer on the train-motor of the rear train being given warning of danger.

In Fig. 16, I illustrate, diagrammatically, track and conductor circuits, as hereinbefore described, there being three blocks of conductors, T, together with a train on the right hand block with the rear car thereof overlapping upon the next block to the rear of its motor, and two train-motors approaching said train from the rear. This figure diagrammatically illustrates the same conditions and operation as to the circuits of the first and second train-motors, as is shown in Figs. 12, 13 and 15, but in Fig. 16, a third train is shown approaching the rear of the second train, in which another operative circuit is shown by heavy black and broken lines which circuit is further illustrated in Fig. 17. This first rear train is affected and stopped by the proximity of the forward train which is being overtaken by it, said forward and first rearwardly approaching trains being then in circuit through the block of one conductor, and through the block of the other conductor to the second rearwardly approaching train, and this action will be continued through any number of trains which approach nearer than half a block to each other, to stop each of them until the block which it is entering is cleared.

From the diagrams and descriptions of the same heretofore given, it will be seen that each train-motor is equipped with self-contained signal, power shut-off, and brake operating apparatus, and with electric circuits for operating said apparatus communicating with track and conductor circuits as hereinbefore described, which operate automatically, without manual attention, to stop a train entering a block occupied by another train, and which also, automatically, without manual attention; operates to stop a train entering a block in which there is a broken rail, an open switch, or other obstruction, any of which contingencies will operate to break the continuous low amperage current flowing through said track and conductor circuits to and through the circuits of the self contained apparatus on the train-motor, so that at all times, accidents, either from trains approaching each other on the same block, or from broken rails, open switches, or other circuit breaking obstructions, are prevented by the automatic stopping of the train without manual attention on the part of the engineer, and the preventing of the starting of the train again, until the block is clear and safe.

I am aware that apparatus for signaling engineers of trains approaching one another on the same block has heretofore been designed, but I am not aware of any self contained device on a locomotive or train motor connected with track and conductor circuits, which will operate automatically to shut off the power, set the train brakes, and retain said mechanism in operative stopping condition, until the external cause producing such condition is removed, wholly without manual or other attention on the part of the engineer, or other operative.

Having thus described my invention and its operation, I do not confine myself to the particular construction herein shown and described as the same can be altered and modified in many ways without departing from the spirit of my invention, therefore What I claim as new and desire to secure by Letters Patent is:

1. In a device of the character described, track rails bonded to form electrical conductors, conductors divided by insulated joints into sections paralleling said rails, in combination with a train-motor, a generator, a power shut-off mechanism, an electromagnetic device for controlling said power shut-off mechanism, circuit-changing switches, contactors normally in contact with said divided conductors, said contactors being operatively connected with the circuit-changing switches, each of said conductors having means adjacent to its insulated joints for controlling the operation of its corresponding contactor, electrical connections from said generator around said electro-magnetic device and through said circuit-changing switches to said contactors and wheels of the train-motor, said connections being normally closed at the circuit-changing switches, connections from said generator through said electro-magnetic device through said circuit changing switches to said contactors and train-motor wheels, said last mentioned connections being normally open at the circuit changing switches, whereby when one of said circuit changing switches is operated the first mentioned connections are opened, and the last mentioned connections are closed, substantially as set forth.

2. In an apparatus of the character described track rails bonded to form electrical conductors, conductors divided into blocks by insulated joints paralleling said rails, in combination with a train-motor, a generator, a power shut-off and brake-setting mechanism, an electro-magnetic device for controlling said power shut-off and brake-setting mechanism, circuit changing switches, contactors normally in contact with said divided conductors said contactors being operatively connected with the circuit changing switches, each of said conductors having means adjacent to its insulated joints for controlling the operation of its corresponding contactor, electrical connections from said generator around said electro-magnetic device and through said circuit changing switches to said contactors and train-motor wheels, said connections being normally closed at the circuit-changing switches, connections from said generator through said electro-magnetic device through said circuit-changing switches to said contactors and the wheels of the train-motor, said last mentioned connections being normally open at the circuit-changing switches, whereby when one of said circuit-changing switches is operated the first mentioned connections are opened and the last mentioned connections are closed, substantially as set forth.

3. In an apparatus of the character described track rails bonded to form electrical conductors, conductors divided by insulated joints into sections paralleling said track-rails, resistant connections between the track-rails and said insulated conductor sections, in combination with a train-motor, two or more electric generators, an electro-magnetic switch adapted to automatically cut out an exhausted or defective generator and cut-in a good one, a power shut-off mechanism, an electromagnetic device for controlling said power shut-off mechanism, circuit-changing switches, contactors normally in contact with said divided conductors said contactors being operatively connected with the circuit-changing switches, each of said conductors having means adjacent to its insulated joints for controlling the operation of its corresponding contactor, electrical connections from said generators through said electro-magnetic switch mechanism, around said electro-magnetic device and through said circuit-changing switches to said contactors and train-motor wheels, said connections being normally closed at the circuit changing switches, connections from said generators through said electro-magnetic switch mechanism, through said electro-magnetic device for controlling the power shut-off mechanism, through said circuit-changing switches to said contactors and the wheels of the train-motor, the last mentioned connections being normally open at the circuit-changing switches, whereby when said circuit changing switches are operated, the first mentioned connections are opened and the last mentioned connections are closed, substantially as set forth.

4. In an apparatus of the character described, track-rails bonded to form electrical conductors, conductors divided by insulated joints into sections paralleling said rails and resistant connections between said track-rails and conductor sections, in combination with a train-motor, a generator, a signal mechanism, a power shut-off mechanism, an electro-magnetic device for controlling said power shut-off mechanism, circuit-changing switches, contactors normally in contact with the divided conductors, said contactors being operatively connected with the circuit-changing switches, each of said conductors having means adjacent to its insulated joints for controlling the operation of its corresponding contactor, electrical connections from said generator around said electro-magnetic device and through said signal mechanism and through said circuit-changing switches to said contactors and the wheels of the train-motor, said connections being normally closed at the circuit-changing switches, connections from said generator, through said signal mechanism through said electro-magnetic device through said circuit-changing switches to said contactors and wheels of the train-motor, said last mentioned connections being normally open at the circuit-changing switches, whereby when said circuit-changing switches are operated the first mentioned connections are opened and the second mentioned connections are closed, substantially as set forth.

5. In an apparatus of the character described, track-rails bonded to form electrical conductors, conductors divided by insulated joints into sections paralleling said rails and resistant connections between each conductor section and said track-rails, in combination with a train-motor, a generator, a power shut-off mechanism, an electro-magnetic device for controlling said power shut-off mechanism, a magnet, a switch controlled thereby adapted to connect said generator with said electro-magnetic device for controlling the power shut-off mechanism whenever a break occurs in any circuit passing through said magnet, circuit changing switches, contactors normally in contact with the divided conductors, said contactors being operatively connected with the circuit changing switches, each of said conductors having means adjacent to its insulated joints for controlling the operation of its corresponding contactor, electrical connections from said generator through said magnet, around said electro-magnetic device and through said circuit-changing switches to said contactors and the wheels of the train-motor, said connections being normally closed at the circuit-changing switches, connections from said generator through said magnet through said electro-magnetic device through said circuit-changing switches to said contactors and the wheels of the train-motor, said last mentioned connections being normally open at the circuit changing switches, whereby when said circuit-changing switches are operated, the first mentioned connections are opened and the last mentioned connections are closed, substantially as set forth.

6. In an apparatus of the character described, track-rails bonded to form electrical conductors, conductors divided by insulated joints into sections paralleling said rails and resistant connections between each conductor section and said track-rails, in combination with a train-motor, a generator, a power shut-off and brake-setting mechanism, an electro-magnetic device for controlling said power shut-off and brake-setting mechanism, a magnet, a switch controlled thereby adapted to connect said generator with said electro-magnetic device for controlling the power shut-off and brake-setting mechanism whenever a brake occurs in any circuit passing through said magnet, circuit-changing switches, contactors normally in contact with the divided conductors, said contactors being operatively connected with the circuit-changing switches, each of said conductors having means adjacent to its insulated joints for controlling the operation of its corresponding contactor, electrical connections from said generator through said magnet, around said electro-magnetic device and through said circuit-changing switches to said contactors and the wheels of the train-motor, said connections being normally closed at the circuit-changing switches, connections from said generator through said magnet, through said electro-magnetic device through said circuit-changing switches to said contactors and the wheels of the train-motor, said last mentioned connections being normally open at the circuit changing switches, whereby when said circuit-changing switches are operated the first mentioned connections are opened and the last mentioned connections are closed, substantially as set forth.

7. In an apparatus of the character described, track-rails bonded to form electrical conductors, conductors divided by insulated joints into sections paralleling said rails and resistant connections between each conductor section and said track-rails, in combination with a train-motor, a generator, a power shut-off and brake-setting mechanism, an electro-magnetic device for controlling the power shut-off and brake-setting mechanism, a magnet, a switch adapted to connect said generator with said electro-magnetic device for controlling the power-shut-off and brake-setting mechanism whenever a break occurs in any circuit passing through said magnet, a signal, an electro-magnetic device for controlling said signal, circuit-changing switches, contactors normally in contact with the divided conductors said contactors being operatively connected with the circuit changing switches, each of said conductors having means adjacent to its insulated joints for controlling the operation of its corresponding contactor, resistant connections on the train-motor adapted to be thrown into circuit by and during the operation of the circuit-changing switches, electrical connections from said generator through said magnet, through said electro-magnetic device for controlling said signal mechanism, around said electro-magnetic device for controlling said power-shut-off and brake-setting mechanism, and through said circuit-changing switches to said contactors and the train-motor wheels, said connections being normally closed at the circuit changing switches, connections from said generator through said magnet and through said electro-magnetic device for controlling the signal mechanism, through said electro-magnetic device for controlling the power shut-off and brake-setting mechanism, through said circuit-changing switches to said contactors and the wheels of the train-motor, said last mentioned connections being normally open at the circuit changing switches, whereby when either of the circuit-changing switches is operated the first mentioned connections are opened and the last mentioned connections are closed, substantially as set forth.

8. In an apparatus of the character described, track-rails bonded to form electrical conductors, conductors divided by insulated joints into sections paralleling said rails, in combination with a train motor, a generator, a power shut-off mechanism, an electro-magnetic device for controlling the power shut-off mechanism, circuit-changing switches, contactors normally in contact with said divided conductors said contactors being operatively connected with the circuit-changing switches, each of said conductors having means adjacent to its insulated joints for controlling the operation of its corresponding contactor, electrical connections from said generator through said electro-magnetic device to the train motor wheels and to said contactors, said connections passing through said circuit changing switches and being connected therewith in parallel, said connections being normally open at said circuit changing switches, whereby when either circuit changing switch is operated said connections are brought into circuit with the track rails and divided conductors, substantially as set forth.

9. In an apparatus of the character described, track rails bonded to form electrical conductors, conductors divided by insulated joints into sections paralleling said rails and resistant connections between said rails and conductor sections, in combination with a train-motor, a generator, a power shut-off mechanism, an electro-magnetic device for controlling said power shut-off mechanism, circuit-changing switches, contactors normally in contact with the divided conductors, said contactors being operatively connected with the circuit changing switches, each of said conductors having means adjacent to its insulated joints for controlling the operation of its corresponding contactor, electrical connections from said generator to said circuit-changing switches, electrical connections from said switches to said contactors and the wheels of the train-motor, forming therethrough and through said track rails, conductor sections and resistant connections therebetween a complete low amperage electric circuit from and to said generator, electric connections from said circuit changing switches to and through said electro-magnetic device which are normally open at the circuit-changing switches, whereby when either of said switches is operated said last mentioned connections and said electro-magnetic device are brought into circuit with the track rails, conductor sections and resistant connections therebetween, substantially as set forth.

10. In an apparatus of the character described, track rails bonded to form electrical conductors, conductors divided by insulated joints into sections paralleling said rails, in combination with a train motor, a generator, a power shut-off and brake-setting mechanism, circuit-changing switches, contactors normally in contact with said divided conductors said contactors being operatively connected with said circuit-changing switches, each of said conductors having means adjacent to its insulated joints for controlling the operation of its corresponding contactor, electric connections leading from said generator to said circuit-changing switches and from said circuit-changing switches to said contactors and to the wheels of the train-motor adapted to bring the track-rails and conductor sections into electric communication with said generator, and electric connections leading from said circuit changing switches to said electro-magnetic device adapted when either of said circuit-changing switches is operated, to bring said electro-magnetic device into electric communication with the generator and said track-rails and conductor sections, substantially as set forth.

11. In an apparatus of the character described, track-rails bonded to form electrical conductors, conductors divided by insulated joints into sections paralleling said rails and resistant connections between said rails and the sections of said divided conductors, in combination with a train-motor, a generator, a power shut-off and brake-setting mechanism, an electro-magnetic device for controlling said power-shut-off and brake-setting mechanism, circuit-changing switches, contactors normally in contact with the divided conductors, said contactors being operatively connected with the circuit-changing switches, each of said conductors having means adjacent to its insulated joints for controlling the operation of its corresponding contactor, electric connections leading from said generator to said circuit-changing switches and from said switches to said contactors and the wheels of the train-motor, said connections completing a normally low amperage circuit around said electro-magnetic device and through said track-rails, divided conductor sections and resistant connections therebetween, a magnet on said train-motor in said low-amperage circuit, a switch adapted to be released by said magnet by reason of a break in said low-amperage circuit, electric connections leading from said switch to said electro-magnetic device and adapted to bring the same into circuit with said generator when said switch is released by said magnet, electric connections leading from said circuit changing switches to said electro-magnetic device, adapted when either of said circuit-changing switches is operated to bring said electro-magnetic device into circuit with the track rails, conductor sections and resistant connections therebetween, substantially as set forth.

12. In an apparatus of the character described, track-rails bonded to form electric conductors, conductors divided by insulated joints into sections paralleling said rails and resistant connections between said rails and said conductor sections, in combination with a train-motor, a generator, a power shut-off and brake-setting mechanism, an electro-magnetic device for controlling said power shut-off and brake-setting mechanism, a signal mechanism, circuit changing switches, contactors normally in contact with the divided conductors said contactors being operatively connected with the circuit-changing switches, each of said conductors having means adjacent to its insulated joints for controlling the operation of its corresponding contactor, a normally closed low-amperage circuit from and returning to said generator including a magnet, a signal operating solenoid, the train-motor wheels, the track-rails, resistant connections, parallel conductor sections, contactors and circuit-changing switches, a switch adapted to be released by said magnet by reason of a break in the above described low-amperage circuit, electric connections from said switch to said electro-magnetic device for controlling the power-shut-off mechanism adapted when said switch is released by said magnet to bring said device into circuit with said generator, electrical connections from the generator through said electro-magnetic device and to said contactors and the train motor wheels, said connections passing through the circuit changing switches and being connected therewith in parallel, said connections being normally open at the circuit changing switches, whereby when either circuit changing switch is operated the electromagnetic device is brought into circuit with the track rails and divided conductors, substantially as and for the purpose set forth.

13. In an apparatus of the character described, track rails bonded to form electrical conductors, conductors divided by insulated joints into sections paralleling said track rails, and resistant connections between said track rails and conductor sections, in combination with a train motor, a generator, power shut-off mechanism, an electromagnetic device for controlling said power shut-off mechanism, circuit changing switches, contactors normally in contact with the divided conductors, said contactors being operatively connected with the circuit changing switches, each of said conductors having means adjacent to its insulated joints for controlling the operation of its corresponding contactor, electrical connections from said generator around said electromagnetic device and through said circuit changing switches to said contactors and the wheels of the train motor, said connections being normally closed at the circuit changing switches, connections from said generator through said electromagnetic device through said circuit changing switches to said contactors and the wheels of the train motor, said last connections being normally open at the circuit changing switches, whereby when said circuit changing switches are operated the first mentioned connections are opened and the second mentioned connections are closed, an electric resistance element so connected with said circuit changing switches as to be brought into circuit with said generator during the operation of either circuit changing switch, a circuit maintaining switch controlled by said electromagnetic device and adapted to be closed when the latter is energized, circuit connections through said electromagnetic device controlled by said circuit maintaining switch, whereby when said electromagnetic device is energized upon the operation of a circuit changing switch, said circuit maintaining switch is closed and said electromagnetic device will be maintained energized after said circuit changing switch has returned to its normal position, substantially as and for the purpose set forth.

14. In an apparatus of the character described, track rails bonded to form electrical conductors, conductors divided by insulated joints into sections paralleling said rails, in combination with a train motor, a generator, power shut-off mechanism, an electro-magnetic device for controlling said power shut-off mechanism, circuit-changing switches, a circuit-maintaining switch operatively connected to said electro-magnetic device adapted to maintain a changed circuit momentarily established by either of said circuit-changing switches, contactors normally in contact with the divided conductors, said contactors being operatively connected with the circuit-changing switches, each of said conductors having means adjacent to its insulated joints for controlling the operation of its corresponding contactor, electrical connections from said generator around said electro-magnetic device and through said circuit-changing switches to said contactors and the wheels of the train-motor, said connections being normally closed at said circuit-changing switches, connections from said generator through said electro-magnetic device through said circuit-changing switches to said contactors and the wheels of the train motor, said connections being normally open at the circuit changing switches, connections from said generator through said electromagnetic device and through said circuit-maintaining switch to the contactors and wheels of the train motor, said last mentioned connections being normally open at the circuit-maintaining switch, whereby when said circuit-changing switches are operated the first mentioned connections are opened, and the second mentioned connections are closed at the circuit-changing switches, substantially as set forth.

In testimony whereof I affix my signature, in presence of two witnesses.

ALEXANDER S. LITTLETON.

Witnesses:
H. J. CARTER,
G. J. MEAD.